(12) United States Patent
Abraham et al.

(10) Patent No.: US 7,504,458 B2
(45) Date of Patent: Mar. 17, 2009

(54) METHOD FOR IMPROVING COMPRESSION SET IN THERMOPLASTIC VULCANIZATES

(75) Inventors: Tonson Abraham, Strongsville, OH (US); Norman G. Barber, Norwalk, OH (US)

(73) Assignee: Advanced Elastomer Systems, LLP, Akron, OH (US)

( * ) Notice: Subject to any disclaimer, the term of this patent is extended or adjusted under 35 U.S.C. 154(b) by 280 days.

(21) Appl. No.: 11/402,695

(22) Filed: Apr. 12, 2006

(65) Prior Publication Data

US 2007/0244253 A1 Oct. 18, 2007

(51) Int. Cl.
*C08L 53/00* (2006.01)
*C08L 21/00* (2006.01)
(52) U.S. Cl. .......................... 525/98; 525/191
(58) Field of Classification Search ............ 525/98
See application file for complete search history.

(56) References Cited

U.S. PATENT DOCUMENTS

| | | | | |
|---|---|---|---|---|
| 3,957,919 | A * | 5/1976 | Von Bodungen et al. | 524/504 |
| 4,104,210 | A * | 8/1978 | Coran et al. | 525/232 |
| 4,151,159 | A * | 4/1979 | Geall et al. | 524/525 |
| 4,197,377 | A | 4/1980 | Bohm et al. | 525/99 |
| 4,202,801 | A * | 5/1980 | Petersen | 525/232 |
| 4,250,273 | A | 2/1981 | Bohm et al. | 525/99 |
| 4,311,628 | A * | 1/1982 | Abdou-Sabet et al. | 524/447 |
| 4,340,684 | A | 7/1982 | Bohm et al. | |
| 4,350,795 | A | 9/1982 | Bohm et al. | 525/194 |
| 4,385,142 | A | 5/1983 | Böhm et al. | |
| 4,906,683 | A * | 3/1990 | Komatsu et al. | 524/528 |
| 4,927,882 | A | 5/1990 | Bayan | 525/99 |
| 5,051,478 | A | 9/1991 | Puydak et al. | 525/195 |
| 5,157,081 | A * | 10/1992 | Puydak et al. | 525/237 |
| 5,248,729 | A | 9/1993 | Inoue et al. | 525/92 |
| 5,397,832 | A * | 3/1995 | Ellul | 524/515 |
| 5,523,356 | A | 6/1996 | Aldrovandi et al. | 525/237 |
| 5,621,045 | A * | 4/1997 | Patel et al. | 525/237 |
| 5,656,693 | A * | 8/1997 | Ellul et al. | 525/171 |
| 5,936,028 | A * | 8/1999 | Medsker et al. | 524/506 |
| 6,255,389 | B1 * | 7/2001 | Ouhadi et al. | 525/76 |
| 6,288,171 | B2 * | 9/2001 | Finerman et al. | 525/192 |
| 6,451,915 | B1 * | 9/2002 | Ellul et al. | 525/191 |
| 6,541,568 | B1 | 4/2003 | Ding et al. | 525/88 |
| 6,646,047 | B2 * | 11/2003 | Tasaka et al. | 525/92 B |
| 6,667,364 | B2 | 12/2003 | Abraham et al. | 524/505 |
| 6,797,779 | B1 | 9/2004 | Ajbani et al. | 525/191 |
| 6,846,877 | B2 * | 1/2005 | Jacob et al. | 525/88 |
| 6,896,962 | B1 | 5/2005 | Valligny et al. | |
| 7,381,771 | B2 * | 6/2008 | Ouhadi et al. | 525/88 |
| 2002/0128390 | A1 * | 9/2002 | Ellul et al. | 525/191 |
| 2003/0013813 | A1 * | 1/2003 | Ellul et al. | 525/191 |
| 2003/0017223 | A1 * | 1/2003 | Tasaka et al. | 425/88 |
| 2003/0060557 | A1 * | 3/2003 | Tasaka et al. | 524/484 |
| 2004/0059046 | A1 * | 3/2004 | Hanna et al. | 524/515 |
| 2004/0059061 | A1 * | 3/2004 | Jourdian et al. | 525/191 |
| 2004/0067380 | A1 * | 4/2004 | Maeda et al. | 428/500 |
| 2004/0132907 | A1 | 7/2004 | Nakamura et al. | 525/88 |
| 2004/0147677 | A1 * | 7/2004 | Angus et al. | 525/194 |
| 2004/0151933 | A1 | 8/2004 | Ajbani et al. | 428/515 |

FOREIGN PATENT DOCUMENTS

| | | |
|---|---|---|
| EP | 0 767 210 | 4/1997 |
| JP | 2003 113278 A | 4/2003 |

OTHER PUBLICATIONS

C.P. Rader, "*Elastomeric Alloy Thermoplastic Vulcanizates*", in Handbook of Thermoplastic Elastomers, B.M. Walker and C.P. Rader eds. Van Nostrand Reinhold, NY, 1988, Ch. 4, p. 86, pp. 96-99.
T. Abraham, and C. McMahan, "*Thermoplastic Elastomers; Fundamentals and Applications*", in Rubber Compounding; Chemistry and Applications, B. Rodgers, ed., Marcel Dekker, Inc., NY 2004, Ch 5, p. 212.
G. Holden and N.R. Legge, *Styrenic Thermoplastic Elastomers*, in Thermoplastic Elastomers, G. Holden, N.R. Legge, R. Quirk, and H.E. Schroeder eds., Hauser/Gardner Publications, Inc., Cincinnati, OH, 1996, Ch 3.
D. Fischer, S. Jungling, M. J. Schneider, J. Suhm, and R. Mulhaupt, "*Influence of Metallocene Structures on Molecular and Supermolecular architecture of Polyolefins*", in Metallocene-Based Polyolefins: Preparation, Properties, and Technology, v1, J. Scheirs and W. Kaminsky eds., John Wiley and Sons, Ltd., New York, NY, 2000, Ch. 3.
C. De Rosa, F. auriemma, G. De Lucia, and 1. Resconi, From stiff plastic to elastic polypropylene: Polymorphic transformations during plastic deformation of metallocene-made isotactic polypropylene, Polymer, 46, 9461 (2005), p. 9461-9475.

* cited by examiner

*Primary Examiner*—Randy Gulakowski
*Assistant Examiner*—Robert Loewe

(57) ABSTRACT

The compression set [(70° C., 22 hr), (100° C., 22 hr)] of TPVs can be improved by substituting, within their respective constituent plastic phase, all or portions of polyolefins having a high melting point, with polyolefins having lower melting point (Tm from between 115° C. to 140° C.). Exemplary polyolefins having melting points in this range include homopolyethylene, syndiotactic polypropylene, and isotactic poly(1-butene). Composition and methods of formulating thermoplastic vulcanizates to achieve an improved high temperature (between 70° C. 100° C.) compression set by selecting between suitable polyolefins on the basis of melting point temperature and substituting from 30% to 100% of high melting point polyolefins with low melting point polyolefins in the plastic phase are taught.

4 Claims, No Drawings

METHOD FOR IMPROVING COMPRESSION SET IN THERMOPLASTIC VULCANIZATES

A. FIELD OF INVENTION

The present invention relates to thermoplastic vulcanizates (also referred to as thermoplastic elastomers) including thermoplastic vulcanizates derived from conjugated diene rubbers and elastomer blends comprising conjugated diene rubbers.

B. BACKGROUND OF THE INVENTION

Thermoplastic vulcanizates ("TPVs") are a fine dispersion of highly vulcanized rubber in a continuous phase of a polyolefin. TPVs are traditionally made by blending a rubber with a semi-crystalline polyolefin under conditions that allow for the dynamic vulcanization of the rubber. The result is a material comprised of a continuous plastic phase formed by the polyolefin and interspersed with discrete, crosslinked rubber particles, which form a rubber phase. TPVs have the benefit of the elastomeric properties provided by the rubber phase, with the processability of thermoplastics.

TPVs have been widely used in applications that are subject to compression forces, including, for example, gaskets, grips, seals, stoppers, and damping pads. In such applications, it is generally preferable to lower the compression set of the TPV in order to improve the article's usefulness without adversely affecting other material characteristics, including processability. Traditionally, efforts to improve compression set in TPVs have focused on achieving a higher rubber cure state in the rubber phase. See, C. P. Rader, "Elastomeric Alloy Thermoplastic Vulcanizates", in HANDBOOK OF THERMOPLASTIC ELASTOMERS 86, 96-99 (B. M. Walker and C. P. Rader eds. Van Nostrand Reinhold, NY, 1988). The plastic phase, which has essentially no inherent elastic recovery, has not been considered as a suitable variable in affecting compression set of TPVs. Rather, the thermoplastic characteristic of the plastic phase is generally viewed as a limiting factor in relation to the compression set of TPVs.

It is generally accepted that, while maintaining a suitable compression set, the upper service temperature of a TPV will directionally relate to the melting point of the plastic phase; namely that using polyolefins having higher melting points in the plastic phase will afford improved compression set in TPVs at higher temperatures. This result would be expected insofar as it would be expected that a plastic phase having a higher melting point would afford improved high temperature (70° C. and 100° C.) elastic recovery of associated TPVs, by virtue of the plastic phase's increased resistance to thermal deformation at higher temperatures. Isotactic homopolypropylene (Tm~165° C.) has been widely adopted as the polyolefin of choice in high temperature TPV applications, for, among other reasons, its high melting point. See, T. Abraham and C. McMaham, "Thermoplastic Elastomers; Fundamentals and Applications", in RUBBER COMPOUNDING ; CHEMISTRY AND APPLICATIONS, 212 (B. Rodgers ed., Marcel Dekker, Inc., New York, N.Y. 2004).

While it is known to use a variety of different polyolefins, including those having high and low melting points, in TPVs, it is generally taught that TPV compositions may include any of the variety of suitable polyolefins, polypropylene and polyethylene being exemplary, in combination with a variety of different elastomers, EPDM rubber and SB rubber being exemplary, without regard to the melting point characteristic of the polyolefin and the effect of polyolefin melting point on the compression set of the resulting TPV.

For example, U.S. Pat. No. 4,250,273 describes a blend of uncured or partially cured mixtures of SB rubber, 1-olefin polymers or copolymers and highly saturated elastomers. However, there is no discussion on selecting between 1-olefin polymers to improve high temperature compression set of the resulting TPV. Further, for processability reasons, this patent discloses uncured or partially cured mixtures rather than fully cured TPVs.

U.S. Pat. No. 4,340,684 describes thermoplastic elastomeric blends of 1-olefin polymers, SB rubbers and highly saturated elastomers and is a divisional patent of the previously mentioned U.S. Pat. No. 4,250,273. Similarly, U.S. Pat. No. 4,350,795 is also a divisional of that same patent. All three of these patents relate to tri-blends including 1-olefin polymer or copolymer and SB rubber. U.S. Pat. No. 4,385,142 is related to these previously described patents, but further include from 5 to 50 parts by weight of bitumen. None of these references disclose compositions having plastic phases selected on the basis of melting point for the purpose of improving TPV compression set.

U.S. Pat. No. 4,927,882 describes thermoplastic elastomer compositions comprising SB rubbers in a co-continuous matrix of SEBS and polypropylene. No reference is made to the substitution of polypropylene with polyolefins having a lower melting temperature for purposes of improving compression set.

U.S. Pat. No. 4,202,801 describes dynamically partially cured blends of monoolefin copolymer rubbers and polyolefin resins. This reference discloses the use of both high and low melting point temperature polyolefins (polypropylene and polyethylene being exemplary) in the partially cured blends, but does not teach distinguishing between the polyolefins to improve compression set of the resulting TPV.

U.S. Pat. No. 4,104,210 describes thermoplastic elastomeric compositions comprising blends of highly unsaturated diene rubber and thermoplastic olefin resins. While a variety of olefin resins are described, including those having high and low melting point temperatures as defined herein, there is no teaching to select between the olefin resins to improve compression set in the composition.

It would be preferable in many instances to improve the compression set of TPVs by taking selective advantage of the distinctive characteristics between polyolefins in the plastic phase, as reflected in their respective melting points.

Finally, the use of processing agents, most notably paraffinic oil, naphthenic oil, and aromatic process oils, to aid in the processability of TPV compositions is well documented (for example in U.S. Pat. No. 6,667,364). Such processing oils reduce viscosity during blending of the plastic and rubber TPV constituents, thus aiding the dispersion of the rubber phase in the continuous plastic phase. Further, the processing oils may be absorbed in the rubber phase of the TPV, thereby increasing the volume of material. By increasing the volume of material using relatively low cost processing oils, overall cost can be reduced. In many instances, it may be preferable to substantially saturate the TPV with processing oil in order to maximize volume and processability. However, over-saturation of the TPV with processing oil can result in oil bleed. It would be advantageous, therefore, to be able to determine the amount of processing oil to add in order to achieve substantial saturation of the TPV without oil bleed.

II. SUMMARY OF THE INVENTION

High temperature compression set (from between 70° C. to 100° C.) of TPVs can be improved by substituting a portion or all of the high melting point polyolefin (Tm greater than 150°

C.), and typically isotactic polypropylene, in the plastic phase with polyolefins having lower melting points (Tm between 115° C. and 140° C.). This effect is achieved in TPVs comprising a wide range of elastomers and elastomeric blends in the rubber phase. Moreover, this effect may be achieved with as little as 30% replacement of the high melting point polyolefin in the plastic phase with low melting point polyolefin.

Accordingly, there is taught a method of achieving at least a 10% improvement in the high temperature compression set of a TPV that includes the steps of selecting a first amount of an elastomer, the elastomer being one or a blend of more than one of a conjugated diene rubber, hydrogenated styrenic triblock copolymer rubber, and ethylene propylene rubber; selecting a second amount of a polyolefin blend, wherein the polyolefin blend comprises from 30% by weight to 100% by weight of the polyolefin blend of at least a first 1-olefin polymer having a melting point of between 115° C. and 140° C. and from 70% by weight to 0% by weight of the polyolefin blend of at least a second 1-olefin polymer having a melting point greater than 150° C.; and wherein the weight percent of the at least a first 1-olefin polymer in the polyolefin blend is selected to achieve the improvement in the compression set of the thermoplastic vulcanizate; and blending the first amount of the elastomer and the second amount of the polyolefin blend.

According to this, and other aspects and embodiments of the invention, the improvement in compression set is demonstrated in comparison to a benchmark thermoplastic vulcanizate. The benchmark TPV is a TPV that is, in all material respects, identical in formulation and preparation, to the improved TPVs of the present invention, except that the plastic phase of the benchmark TPV is substantially entirely a high melting point polyolefin, and preferably isotactic polypropylene.

According to another aspect of the invention, the amount of the elastomer in the TPV may be from 20% by weight to 80% by weight of the total amount of plastic plus elastomer in the TPV. The amount of the polyolefin blend may be from 20% by weight to 80% by weight of the total plastic plus elastomer in the TPV. For purposes of this application, the term % by weight when used in relation to the amount of the elastomer or the polyolefin blend shall mean the amount per 100 parts of the total amount of elastomer and polyolefin.

According to another aspect of the invention, the compression set may be improved up to 55% over the benchmark TPV.

According to another aspect of the invention, suitable elastomers may include styrene butadiene rubber, polybutadiene rubber, and polyisoprene rubber, styrene/isoprene/styrene triblock copolymer rubber (SIS) and styrene/butadiene/styrene triblock copolymer rubber (SBS) rubber, SEEPS, SEPS, and SEBS rubber, EPDM rubber, and EP rubber, and blends of the aforementioned.

According to another aspect of the invention, suitable low melting temperature polyolefins may include polyethylene, isotactic poly (1-butene), and syndiotactic polypropylene. Suitable high melting point polyolefins may include isotactic polypropylene.

According to still another aspect of the invention, methods are taught of producing TPVs having plastic phases in which at least 60% of the plastic phase is a high melting point polyolefins, but having a compression set of less than 25% and improved compression set over the benchmark TPV.

Additionally, there is taught a method of formulating thermoplastic vulcanizates, including thermoplastic vulcanizates having SB rubber as the elastomer in combination with one or more of the polyolefins taught herein, to maximize the amount of paraffinic or naphthenic oil without causing oil bleed. The method involves selecting an amount of processing oil based on a vinyl weight fraction of the copolymerized butadiene in the styrene butadiene rubber and a copolymerized butadiene weight fraction of the styrene butadiene rubber, in order to achieve substantial saturation.

IV. DESCRIPTION OF THE PREFERRED EMBODIMENT

Isotactic homopolypropylene ("iHPP") (Tm~165° C.) is the most commonly used high melting point polyolefin, and the most widely used polyolefin as the plastic phase, in commercially available TPVs. iHPP is widely used in combination with conjugated diene rubbers, including styrene butadiene rubber ("SB"), polybutadiene rubber ("PB"), and polyisoprene rubber; hydrogenated styrenic triblock copolymer elastomers, including SEBS, SEPS, and SEEPS copolymers; and ethylene propylene rubbers, including EP and EPDM rubber, and blends thereof, in the formulation of TPVs. The present invention discloses methods of improving compression set by substituting within these TPVs 30% or more by weight of the high melting point polyolefin, typically iHPP, with a low melting point polyolefin. Though the methods described herein relate to TPVs comprising commercially available rubbers and high and low melting point temperature polyolefins, the following definitions are provided to clarify the scope of these materials.

The term "rubber" as used herein means any natural or synthetic polymer which can be vulcanized or cured so as to exhibit elastomeric properties. The term "elastomer" is used interchangeably with the term rubber. The term "plastic" and "polyolefin" may also be used interchangeably.

SB rubber refers to random block copolymers of styrene and butadiene. The SB rubber may have a styrene content of between 1% to 50% by weight of the SB rubber. Styrene content of between 15% and 45%, and preferably between 20% and 40%, and still more preferably between 20% and 30% are also contemplated in accordance with the present invention. Suitable butadiene micro structures may include 1,2-butadiene, and cis and trans 1,4-butadiene. The copolymer may be prepared in any of the well known conventional cis and trans processes, such as through solution or emulsion polymerization. The weight percent of the butadiene in the SB rubber may range from 50% by weight to 99% by weight. Weight percents of butadiene in the SB rubber of between 85% and 55%, and preferably between 80% and 60%, and still more preferably between 80% and 70% are contemplated in accordance with the present invention. Larger or smaller amounts of butadiene may be employed. The butadiene portion may contain from 10% to 90% of 1,2-polybutadiene, with the remainder consisting essentially of cis and trans 1,4-polybutadiene. The ratio of cis-to-trans isomers in the 1,4-polybutadiene may be between 0.2 and 0.65. The molecular weight, on a number average value, may be from 30,000 to greater than one million. The exemplary emulsion SB rubber used in the composition set forth in the examples in 1502NN manufactured by The Goodyear Tire and Rubber Company.

PB rubber refers to homopolymers of butadiene having a cis-1,4 butadiene content as low as 5% to as high as 98% by weight. PB rubber also refers to homopolymers of butadiene having a vinyl-1,2 butadiene content as low as 2% and as high as 90% by weight. As discussed above, and described in further detail below, it has been discovered that the capacity of PB rubber and SB rubbers to hold processing agents is determined by the vinyl content of the polybutadiene. The molecular weight, on a number average value, may be from 30,000 and greater than one million.

Polyisoprene rubber refers to homopolymers of isoprene, including natural rubber. Polyisoprene rubber may have a cis-content as low as 5% to as high as 98% by weight. The molecular weight, on a number average value, may be from 30,000 and greater than one million.

EPM is an ethylene-propylene copolymer rubber which can be cross-linked by radiation curing or peroxide curing. EPDM rubber refers to a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,4-cyclohexadiene; tetrahydroindene; methyltetrahydroindene; dicyclopentadiene; 5-isopropylidene-2-norbornene; 5-vinyl-norbornene; etc. The ethylene content of the EPDM rubber may be from 25% to 80% by weight. Weight percents of the ethylene in the EPDM rubber of between 30% and 70%, and preferably 45% and 65%, and still more preferably 50% and 60% are contemplated in accordance with the present invention. The non-conjugated diene content may be from 2% to 10% by weight, with the remaining content being substantially polypropylene. The molecular weight, on a number average value, may be from 30,000 and greater than one million. The exemplary EPDM rubbers used in the compositions set forth in the examples are V3666 (EP(ENB)DM) and MDV 99-1-2 (EP(VNB)DM) manufactured by ExxonMobil.

SIS and SBS rubber refer to styrene/isoprene/styrene and styrene/butadiene/styrene triblock copolymer elastomers respectively. These rubbers are styrenic triblock copolymers having a conjugated diene midblock based on butadiene or isoprene and may be referred to herein collectively as unsaturated stryenic triblock copolymer rubbers.

Hydrogenated styrenic triblock copolymer elastomers, exemplified by SEBS (styrene/ethylene-butylene/styrene), SEPS (styrene/ethylene-propylene/styrene), SEEPS (styrene/ethylene-ethylene-propylene/styrene) are widely commercially available and are described in further detail in U.S. Patent Application Pub. No. 2004/0132907. As noted in the aforementioned reference, hydrogenated styrenic triblock copolymers may include crosslinkable styrenic blocks, which, in combination with the crosslinkable midblocks, may afford greater overall crosslinking of the cured elastomer within the TPV. These elastomers may have a styrene content as low as 10% by weight to as high as 50% by weight, preferably 20% and 40% by weight, and most preferably from 25% to 35% by weight. The molecular weight of the styrene component may be from 7,000 to 50,000 and the molecular weight of the elastomeric component may be from 30,000 to greater than 150,000. Methods of forming suitable hydrogenated styrenic triblock copolymer elastomers are well known in the art. See, G. Holden and N. R. Legge, "Styrenic Thermoplastic Elastomers", in THERMOPLASTIC ELASTOMERS, Ch. 3 (G. Holden, N. R. Legge, R. Quirk, and H. E. Schroeder eds., Hauser/Gardner Publications, Inc., Cincinnati, Ohio, 1996).

By substituting 30% or more of iHPP with a lower melting point polyolefin in TPV formulations comprising these rubbers, the high temperature compression set of the resulting fully cured TPV may be significantly improved as compared to a benchmark TPV. For purposes of this invention, the term "high melting point polyolefin" refers to polyolefins suitable for use in the preparation of TPVs having a melting point (Tm) greater than 150° C. As noted above, the most commonly available and widely used high melting point polyolefin is iHPP.

The term "low melting point polyolefin" refers to polyolefins suitable for use in the preparation of TPVs having a melting point between 115° C. and 140° C. For purposes of this invention melting point is determined with reference to the DSC peak. Suitable polyolefins within this range may include homopolymers of ethylene (Tm~130° C.), including high density polyethylene, low density polyethylene, very low density polyethylene, ethylene/propylene copolymer, ethylene/1-butene copolymer, ethylene/l1-hexene copolymer, ethylene/1-octene copolymer (collectively, the polyethylene homopolymers and copolymers are referred to as "polyethylene" unless otherwise stated); isotactic poly(1-butene) (Tm~125° C.) and copolymers of 1-butene with ethylene, propylene, 1-hexene, or 1-octene (collectively, the isotactic poly(1-butene) homopolymers and copolymers are referred to as "isotactic poly(1-butene)" unless otherwise stated); and syndiotactic polypropylene (Tm~125° C.) and copolymers of syndiotactic propylene with ethylene, 1-butene, 1-hexene, or 1-octene (collectively, the syndiotactic propylene homopolymers and copolymers are referred to as "syndiotactic propylene" unless otherwise stated).

Suitable low melting point polyolefins may also be formed through the incorporation of stereo or regio-defects into a polymer using appropriate catalyst technologies that are well known in the art. See, D. Fischer, S. Jungling, M. J. Schneider, J. Suhm, and R. Mulhaupt, "Influence of Metallocene Structures on Molecular and Supermolecular Architecture of Polyolefins", in 1 METALLOCENE-BASED POLYOLEFINS: PREPARATION , PROPERTIES , AND TECHNOLOGY , Ch. 3 (J. Scheirs and W. Kaminsky eds., John Wiley and Sons, Ltd., New York, N.Y., 2000) and also C. De Rosa, F. Auriemma, G. De Lucia, and L. Resconi, 46 POLYMER 9461 (2005). In this way, defect laden iHPP (denoted "iHPP*") may be created to have a melting point in the range of 115° C. to 140° C., thereby allowing it to be a suitable replacement for iHPP in the plastic phase of the TPVs described herein, with the attendant improvement in compression set. For purposes of this invention, however, unless otherwise stated, the term isotactic homopolypropylene or iHPP shall refer to a polymer having substantially no intentionally introduced defects.

The term "benchmark TPV" refers to a TPV that is formulated and prepared in all material respects to the respective TPVs formed according to the methods taught herein, except that the plastic phase or portion of the TPV is substantially entirely a high melting point polyolefin, which is typically isotactic polypropylene. This TPV is called a "benchmark" because it reflects the preferred formulation presently practiced to achieve the best high temperature compressions set.

The term "high temperature compression set" means compression set as determined according to the methods described herein in relation to the examples below, but generally refers to the compression set at temperatures of between 70° C. and 100° C. The term "compression set" is used herein synonymously with "high temperature compression set."

In accordance with the present invention and with reference to the Examples set forth below, the compression set of benchmark TPVs having an elastomer phase selected from conjugated diene rubber, unsaturated styrenic triblock copolymer rubber, hydrogenated styrenic triblock copolymer rubber, ethylene propylene rubber, and blends thereof, and preferably including SB rubber and PB rubber, and a plastic phase selected substantially entirely from a high melting point polyolefin, including iHPP, is improved at least 10% by substituting from 30% to 100% of the high melting point polyolefin with a low melting point temperature polyolefin, which may be polyethylene, isotactic poly(1-butene) or syndiotactic polypropylene. Despite the lower melting point of the substituted low melting point polyolefins, compression set is systematically improved by this substitution.

TPVs having improved compression set are formed by a method that includes the step of selecting a first amount of an elastomer, selecting a second amount of a polyolefin blend, wherein the polyolefin blend includes from 30% by weight to 100% by weight, and in another embodiment, an amount greater than 40% by weight of the polyolefin blend, of a low melting point polyolefin—the amount of the low melting point polyolefin being selected to achieve an improvement in the compression set of the resultant TPV of at least 10% compared to a benchmark TPV. The method may further include the step of blending the first amount of the elastomer and the second amount of the polyolefin blend.

In one embodiment, the first amount of the elastomer may be from 20% by weight to 80% by weight per 100 parts of the total amount of elastomer and plastic in the TPV, and the plastic may be from 80% by weight to 20% by weight by weight. In another embodiment, the first amount may be from 40% to 60% by weight and the second amount may be from 60% 40% by weight.

The polyolefin blend may include from 30% by weight, and preferably 40% by weight to 100% by weight of at least a first 1-olefin polymer having a melting point of between 115° C. and 140° C. The polyolefin blend may further include from 70% by weight, and preferably 60% by weight, to 0% by weight of at least a second 1-olefin polymer having a melting point greater than 150° C. The polyolefin blend may include substantially no amount of the high melting point polyolefin. In other embodiments, the polyolefin blend may comprise from 30% to 99% by weight, and preferably 30% to 60% by weight, and most preferably from 35% to 50% by weight of the first 1-olefin polymer. In these and other embodiments, the polyolefin blend may include from 70% to 1% by weight, and preferably 70% to 40% by weight, and most preferably from 65% to 50% by weight of the second 1-olefin polymer.

The amount of the low melting point polyolefin in the polyolefin blend is selected to achieve an improvement in compression set of the resultant TPV as compared to a respective benchmark TPV. The improvement may be at least 10%. In other embodiments, the improvement may be as high as 55%. The desired improvement in compression set may be from 10% to 55%, and in another embodiment, from 20% to 50%, and in still another embodiment from 25% to 55%, and in still a further embodiment, from 30% to 40%. The desired improvement in compression set as compared to benchmark TPVs may be greater than 15%. Improvement in compression set greater than 55% may be possible.

With respect to the methods described herein, the elastomer may be any suitable elastomer described herein and blends thereof, including conjugated diene rubber unsaturated stryrenic triblock copolymer rubber, hydrogenated styrenic triblock copolymer rubber, and ethylene propylene rubber, with conjugated diene rubber preferred. Conjugated diene rubber may include styrene butadiene rubber, polybutadiene rubber, polyisoprene rubber, and blends thereof, with styrene butadiene rubber being preferred. Unsaturated styrenic triblock copolymer rubber may include SIS and SBS rubber. Hydrogenated styrenic triblock copolymer rubber may include SEEPS, SEPS, SEBS and blends thereof. Ethylene propylene rubber may include EPDM rubber, EP rubber, and blends thereof, with EPDM rubber preferred.

As indicated above, the elastomer may be one, or a blend of more than one of the selected rubbers. In one embodiment, the elastomer may be substantially all SB rubber. In another embodiment, the elastomer may be an elastomer blend including SB rubber and EPDM. The amount of EPDM in the blend may be from 5% by weight to 50% by weight of the blend. In another embodiment, the amount of EPDM rubber may be from 20% to 50% by weight, and in still another embodiment, from 30% to 50% by weight of the blend. In a preferred embodiment, the amount of EPDM rubber may be from 25% to 40% by weight. In these and other embodiments, the amount of SB rubber in the blend may be from 95% to 50% by weight, and preferably from 80% to 50% by weight, and more preferably from 70% to 50% by weight and in another embodiment preferably from 60% to 75% by weight and more preferably 65% to 75% by weight. Blends of SB rubber and EPDM having greater than 50% by weight of EPDM may also be selected. In still other embodiments, EP rubber may be used in place of all or a portion of the EPDM rubber in the selected elastomer. In still other embodiments, hydrogenated styrenic triblock copolymer elastomers may be used in place of all or a portion of the EPDM rubber in a blend with SB rubber. In this embodiment, the hydrogenated styrenic triblock copolymer elastomer, and preferably, SEBS rubber, may be used in place of all or a portion of the EPDM rubber. SEBS rubber may comprise from 5% by weight to 50% by weight, and preferably from 30% to 50% by weight, and most preferably 40% to 50% by weight of the elastomer; however blends having greater than 50% by weight of SEBS or other styrenic triblock copolymer elastomers may be used in the blend. In other embodiments, the selected elastomer may be PB rubber or polyisoprene rubber or SIS or SBS rubber or blends of PB rubber, polyisoprene, SIS or SBS rubber with one or more of EP, EPDM, SEBS, SEPS, or SEEPS rubber, where the amount of the lather rubbers are up to 50% by weight of the elastomer. It is noted that one of ordinary skill in the art will be able to identify a plurality of other possible blends of elastomers that may be used according to the present invention. In the preferred embodiment, however, the elastomer is at least 50% by weight of a conjugated diene rubber.

Commercially, the polyolefin most widely used in TPVs and having a melting point above 150° C. is iHPP (Tm~165° C.). In an alternate method, therefore, the second 1-olefin polymer described above may have a melting point greater than 160° C., and in still another embodiment, greater than 165° C. Polyolefins have a melting point between 115° C. and 140° C. have been previously described above.

While it has been demonstrated that 40% by weight of low melting point polyolefin content in the polyolefin blend provides improved compression set, it is anticipated that as little as 30% by weight low melting point polyolefin content will achieve improved high temperature compression set of at least 10% over the respective benchmark TPV.

TPVs formed according to the present method may have high temperature compression set values of less than 40% and as low as 9%. TPVs comprising PB rubber as the elastomer may have high temperature compression set values of less than 18%. TPVs having SB rubber in the elastomer in an amount greater than 50% by weight of the elastomer may have high temperature compression set values as low as 9%. In preferred embodiment, the TPVS of the present invention may have a compression set of between 9% and 40% and preferably less than 30% and most preferably, less than 25%, and still more preferably less than 20%.

Compression set values of less than 25% may be achieved in TPVs wherein the polyolefin blend includes at least 60% by weight of isotactic polypropylene. In another embodiment, compression set values of less than 15% may be achieved in TPVs wherein the polyolefin blend includes at least 60% by weight of isotactic polypropylene. In the latter embodiment, the preferred elastomer includes SB rubber blended with EPDM rubber.

The method may further include steps know in the art in relation to the preparation of TPVs. For example, the method may include the step of dynamically vulcanizing the elastomer/polyolefin blend to cure the elastomer. Suitable curing methods may include peroxide cure, sulfur cure, resin cure, and hydrosilylation cure. The curing method selected may depend on the TPV formulation as it is known that certain elastomers will respond more efficiently to specific curing methods. Suitable curing agents and co-agents may be used in amounts that are well known in the art.

In a preferred embodiment, the elastomer may be fully cured. The term "fully cured" or "fully vulcanized" relative to the dynamically vulcanized rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of extractable components. Using this measure of the degree of cure, the improved thermoplastic elastomeric compositions may be produced by vulcanizing the curable rubber component of the blends to the extent that the composition contains no more than six percent by weight of the cured rubber component extractable at room temperature by a solvent which dissolves the rubber which is intended to be vulcanized, and preferably to the extent that the composition contains less than three percent by weight extractable.

A selected third amount of a processing agent may be added to the TPV, before or during the blending stage. Suitable processing agents may include naphthenic oil and paraffinic oil. In one embodiment, from 0 to 200 parts per hundred rubber of processing agent may be added. In another embodiment, an amount of processing agent selected to substantially saturate the TPV without resulting oil bleed may be added.

Where the elastomer is only diene rubber, such as PB rubber, or styrene/diene rubber, such as SB rubber, it has been discovered that the amount of paraffinic or naphthenic oil that can be held by the resultant TPV without oil bleed (the "oil holding capacity") bears a relation to the weight fraction of the diene that polymerizes to yield vinyl groups (the "vinyl weight fraction of the diene") in the rubber, the remainder of the polymerized diene being present as cis and trans units.

In accordance with this, the oil holding capacity (parts per hundred rubber) of TPVs having iHPP, isotactic poly (1-butene) or syndiotactic polypropylene as the plastic and SB rubber as the elastomer may be determined by the formula:

$$BD*[66+(V-0.15)*68]$$

Wherein BD is the weight fraction of copolymerized butadiene in the SB rubber and V is the vinyl weight fraction of the copolymerized butadiene.

In TPVs having polyethelene as the plastic and SB rubber as the elastomer, the oil holding capacity may be determined by the formula:

$$BD*[46.7+(V-0.15)*68]$$

When a TPV contains a blend of PE and iPP (or iPB or sPP) as the plastic and SB rubber as the elastomer, the oil holding capacity may be determined by interpolating between the above referenced formulas. The oil holding formulas presented herein may be incorporated into the methods of forming TPVs described herein.

In addition to an amount of processing agent, various fillers, such as carbon black and clay, antioxidants, antiozonants, stabilizers, lubricants (e.g., oleamide), antiblocking agents, antistatic agents, waxes, coupling agents for the fillers, foaming agents, pigments, fire retardants, titanium dioxide, talc, and other similar materials may be selected and blended into the TPV, in amounts that are well known in the art of compounding.

The present invention includes TPVs formed according to the methods described herein. Preferably the TPVs are fully cured.

In support of the discovery disclosed herein relating to the effect of selecting low melting point polyolefins to improve high temperature compression set in TPVs, the following Examples are offered.

In accordance with the processes used in the Examples, thermoplastic vulcanizate preparation was carried out under nitrogen in a laboratory Brabender-Plasticorder, model EPL-V5502. The mixing bowls had a capacity of 85 ml with the cam-type rotors employed. The plastic was initially added to the mixing bowl that was heated to 180° C. and at 100 rpm rotor speed. After plastic melting (2 minutes.), the rubber, inorganic additives, and oil were packed into the mixer. After homogenization of the molten polymer blend (in 3-4 minutes. A steady torque was obtained), the curative was added to the mix, which caused a rise in the motor torque. Mixing was continued for 4 more minutes, after which the molten TPV was removed from the mixer, and pressed when hot between Teflon plates into a sheet which was cooled, cut-up, and compression molded at 400° F. A Wabash press, model 12-1212-2 TMB was used for compression molding, with 4.5"×4.5"×0.06" mold cavity dimensions in a 4-cavity Teflon-coated mold. Material in the mold was initially preheated at 400° F. for 2-2.5 min. at a 2-ton pressure on a 4" ram, after which the pressure was increased to 10-tons, and heating was continued for 2-2.5 min. more. The mold platens were then cooled with water, and the mold pressure was released after cooling (140° F.).

Dog-bones were cut out of the molded (aged at room temperature for 24 hr.) plaque for tensile testing (0.16" width, 1.1" test length (not including tabs at end)). The tension set specimens were 0.1" wide, with a 2" test length (not including tabs at end). Tension set was measured at room temperature by holding the specimens in a jig at 100% elongation for 10 min., and then allowing the unloaded test specimen to relax for 10 min., before measuring "set". For compression set measurement, 6-7 buttons (0.75" dia.) were cut from the compression molded plaques, stacked, and compressed 25% in a jig before heating to the test temperature. At the end of the test period, the hot buttons were recovered from the jig and cooled for 0.5 hr. in air before measuring the "set" taken by the sample.

For purposes of the Examples, the following materials were used:

| Elastomers | |
|---|---|
| SBR 1502NN | Goodyear Emulsion SBR. 23.5 wt % bound styrene, 76.5 wt % bound butadiene. Bound butadiene microstructure: 16% vinyl, 14% cis, 70% trans. |
| SBR VSL | Bayer Solution SBR. 25 wt % bound styrene, |

-continued

| | |
|---|---|
| 5025-0 HM | 75 wt % bound butadiene. Butadiene microstructure: 65.5% vinyl, 14.1% cis, 20.4% trans. |
| Budene 7076 | Goodyear Solution Polybutadiene rubber. 70% vinyl, 7.5% cis, 22.5% trans; 3 phr aromatic oil. |
| Budene 1280 | Goodyear Solution Polybutadiene rubber. 96% cis, 2% trans, 2% vinyl. |
| V3666 | ExxonMobil EP(ENB)DM: 64 wt % ethylene, 3.9 wt % ethylidenenorbornene, 75 phr paraffinic oil. |
| MDV 99-1-2 | ExxonMobil EP(VNB)DM: 60 wt % ethylene, 2.0 wt % vinylnorbornene, 100 phr paraffinic oil. |
| Plastics | |
| PP51S07A | Sunoco 0.8 MFR iPP homopolymer |
| HD 6706.19 | ExxonMobil 7.0 MI HDPE |
| PB0110 | Basell 1.0 MI isotactic poly (1-butene) homopolymer |
| Rubber Curatives | |
| SP1045, SP1045P (Pastilles) | Schenectady "resole" type phenolic resin. |
| DC 5-0210 | Dow Corning Trimethylsilyloxy terminated polymethylhydrogensiloxane (DP = 18). |
| DC 2-5084 | Dow Corning. DC5-0210 with 5 out of the 18 silicone hydride bonds alkylated with 1-octene. |
| Catalysts for Rubber Curatives | |
| PC085 | United Chemical Technologies Pt°/methylvinylcyclotetrasiloxane complex diluted in paraffinic oil to yield 0.5 mg Pt°/g oil. |
| $SnCl_2 \cdot 2H_2O$ | Promoter for phenolic resin cure of rubber. |
| ZnO | Scorch retarder for phenolic resin cure, acid scavenger for all TPVs. |
| Other Materials | |
| Sunpar 150M, Sunpar 150 LW, and AES 150 PR | Sunoco paraffinic oils |

EXAMPLE 1

In Example 1, improved compression set (%, 22 hr, 70° C.) resulting from the replacement of iHPP (Tm~165° C.) with high density PE (Tm~130° C.) in a TPV comprising emulsion SB rubber as the rubber is demonstrated. Controls 1c and 2c ("c" represents "control") were prepared by heat blending 100 parts of SB rubber and 70 parts of iHPP, without (in 1c) and with (in 2c) 35 parts of paraffinic oil. Samples (1 and 2) were prepared by blending 100 parts of SB rubber and 70 parts of high density PE, without (in 1) and with (in 2) 35 parts of paraffinic oil. All formulations were fully cured using a suitable resin cure. Comparing TPV Sample 1 with TPV Control 1c, shows that compression set improved 31% (from 48% with iHPP to 33% with PE). Comparing TPV Sample 2 with TPV Control 2c, shows that compression set improved approximately 20% (from 46% to 37%). Improvement in compression set was demonstrated in TPVs formed with and without paraffinic oil.

TABLE 1

| | Formulation | | | |
|---|---|---|---|---|
| | 1c | 1 | 2c | 2 |
| SBR 1502NN | 100 | 100 | 100 | 100 |
| PP 51S07A | 70.0 | — | 70.0 | — |
| $SnCl_2 \cdot 2H_2O$ | 1.80 | 1.80 | 1.80 | 1.80 |
| SP 1045 | 8.00 | 8.00 | 8.00 | 8.00 |
| HD 6706.19 | — | 70.0 | — | 70.0 |
| Sunpar 150LW | — | — | 35.0 | 35.0 |
| Hardness (Shore A) | 92 | 90 | 85 | 82 |
| UTS (psi) | 2495 | 1868 | 1257 | 908 |
| UE (%) | 311 | 326 | 184 | 193 |
| M100 (psi) | 1684 | 1265 | 1032 | 733 |
| CS (%, 22 hr, 70° C.) | 48 | 33 | 46 | 37 |
| TS (%) | 23 | 25 | 18 | 21 |

EXAMPLE 2

In Example 2, improved compression set (%, 22 hr, 100° C.) resulting from both full and partial replacement of iHPP (Tm~165° C.) with high density PE (Tm~130° C.) in TPVs comprising solution SB rubber as the rubber and a solution SBR/EP(VNB)DM blend as the rubber is shown. Master batch 1mb ("mb" is master batch) is a blend of 100 parts of SB rubber, 42 parts clay and 75 parts of paraffinic oil. Control 3c was prepared by blending 217 parts of master batch 1mb with 40 parts of iHPP and suitable amounts of hydrosilylation curing agents. In Sample 3.1, iHPP was replaced by 40 parts of high density PE. In Sample 3.2, the iHPP was replaced with a blend of 24 parts of iHPP and 16 parts of high density PE, representing a 40% replacement of iHPP with PE. The compression set was improved in both Samples 3.1 and 3.2 as compared to Control 3c. With 100% replacement of iHPP with PE, compression set improved 47% (from 53% with iHPP to 28% with PE). With 40% replacement of iHPP with PE, compression set improved nearly 53% (from 53% to 25%).

Master batch 2mb is a blend of 70 parts SB rubber, 60 parts EP(VNB)DM rubber, 42 parts clay and 52.5 parts paraffinic oil. Control 4c was prepared by blending 224.5 parts of master batch 2mb with 40 parts of iHPP and suitable amounts of hydrosilylation curing agents. In Sample 4, iHPP was replaced with a blend of 24 parts of iHPP and 16 parts of high density PE, representing a 40% replacement of iHPP with PE. With 40% replacement of iHPP with PE, compression set improved 43% (from 44% to 25%) in TPVs comprising elastomer blends having a large amount (30%) of EP(VNB)DM rubber.

TABLE 2

| | Formulation | | | | | | |
|---|---|---|---|---|---|---|---|
| | 1mb* | 2mb* | 3c | 3.1 | 3.2 | 4c | 4 |
| SBR VSL 5025-0 HM | 100 | 70.0 | | | | | |
| Icecap K clay | 42.0 | 42.0 | | | | | |
| AES 150 PR | 75.0 | 52.50 | | | | | |
| MDV 99-1-2 | — | 60.0 | | | | | |
| 1mb | | | 217 | 217 | 217 | — | — |

TABLE 2-continued

|  | Formulation | | | | | |
| --- | --- | --- | --- | --- | --- | --- |
|  | 1mb* | 2mb* | 3c | 3.1 | 3.2 | 4c | 4 |
| PP 51S07A |  |  | 40.0 |  | 24.0 | 40.0 | 24.0 |
| PC085 (0.5 mg/g) |  |  | 4.00 | 4.00 | 4.00 | 4.00 | 4.00 |
| DC 5-0210 |  |  | 3.00 | 3.00 | 3.00 | 3.00 | 3.00 |
| HD 6706-19 |  |  | — | 40.0 | 16.0 | — | 16.0 |
| 2mb |  |  |  |  |  | 224.50 | 224.50 |
| Hardness (Shore A) |  |  | 51 | 52 | 55 | 60 | 58 |
| UTS (psi) |  |  | 441 | 500 | 530 | 521 | 541 |
| UE (%) |  |  | 217 | 155 | 209 | 117 | 135 |
| M100 (psi) |  |  | 329 | 421 | 375 | 491 | 471 |
| CS (%, 22 hr, 100° C.) |  |  | 53 | 28 | 25 | 44 | 25 |
| TS (%) |  |  | 12 | 10 | 8 | Broke | 8 |

*Master Batch

EXAMPLE 3

In Example 3, improved compression set (%, 22 hr, 100° C.) resulting from both full and partial replacement of iHPP (Tm~165° C.) with high density PE (Tm~130° C.) in TPVs comprising solution SB rubber as the rubber and a solution SBR/EP(ENB)DM blend as the rubber is shown. Master batch 3mb is a blend of 70 parts of SB rubber, 52.5 parts EP(ENB)DM rubber, 15 parts clay, 10 parts carbon black, and 70 parts of paraffinic oil. Control 5c was prepared by blending 217.5 parts of the master batch 3mb with 40 parts of iHPP and suitable amounts of resin curing agents. In Sample 5, the iHPP was replaced with a blend of 24 parts of iHPP and 16 parts of high density PE, representing 40% replacement of iHPP with PE. With 40% replacement of iHPP with PE, compression set improved 25% (from 20% to 15%).

Master batch 4mb is a blend of 100 parts SB rubber, 15 parts clay, 10 parts carbon black, and 75 parts of paraffinic oil. Control 6c was prepared by blending 200 parts of the master batch 4mb with 49 parts of iHPP and suitable amounts of resin curing agents. In Sample 6, the iHPP was entirely replaced with high density PE. With 100% replacement of iHPP with PE, compression set improved 29% (from 24% to 17%).

TABLE 3

|  | Formulation | | | | | |
| --- | --- | --- | --- | --- | --- | --- |
|  | 3mb* | 4mb* | 5c | 5 | 6c | 6 |
| SBR VSL 5025-0 HM | 70.0 | 100 |  |  |  |  |
| V 3666 | 52.50 | — |  |  |  |  |
| Sunpar 150M | 70.0 | 75.0 |  |  |  |  |
| Ice cap K clay | 15 | 15.0 |  |  |  |  |
| N330 Black | 10 | 10.0 |  |  |  |  |
| PP 51S07A |  |  | 40.0 | 24.0 | 49.0 | — |
| 3mb |  |  | 217.5 | 217.5 |  |  |
| SnCl$_2$•2H$_2$0 |  |  | 1.80 | 1.80 | 2.20 | 2.20 |
| SP 1045P |  |  | 4.00 | 4.00 | 5.00 | 5.00 |
| HD 6706.19 |  |  | — | 16.0 | — | 49.0 |
| 4mb |  |  |  |  | 200 | 200 |
| Hardness (ShoreA) |  |  | 63 | 58 | 71 | 69 |
| UTS (psi) |  |  | 963 | 775 | 1496 | 1204 |
| UE (%) |  |  | 228 | 183 | 264 | 273 |
| M100 (psi) |  |  | 504 | 462 | 700 | 617 |
| CS (%, 22 hr, 100° C.) |  |  | 20 | 15 | 24 | 17 |
| TS (%) |  |  | 6 | 6 | 7 | 11 |

*Master Batch

EXAMPLE 4

In Example 4, improved compression set (%, 22 hr, 100° C.) resulting from the replacement of iHPP (Tm~165° C.) with high density PE (Tm~130° C.) and, alternatively, iPB (Tm~125° C.), in a TPV comprising PB rubber as the rubber is shown. Control 7c was prepared by blending 103 parts of PB rubber, 39 parts of iHPP, 10 parts of isotactic poly(1-butene), with an amount of oil and suitable amounts of resin curing agents. In Sample 7.1, the iHPP was entirely replaced by high density PE. In Sample 7.2, the iHPP was entirely replaced by isotactic poly(1-butene). All formulations were fully cured using a resin cure. The replacement of iHPP with PE yielded a 38% improvement in compression set (from 26% to 16%). The replacement of iHPP with isotactic poly (1-butene) yielded a nearly 31% improvement in compression set (from 26% to 18%).

TABLE 4

|  | Formulation | | |
| --- | --- | --- | --- |
|  | 7c | 7.1 | 7.2 |
| Budene 7076 | 103 | 103 | 103 |
| Sunpar 150M | 100 | 100 | 100 |
| PP51S07A | 39.0 | — | — |
| PB 0110 | 10.0 | 10.0 | 49.0 |
| ZnO | 2.00 | 2.00 | 2.00 |
| SnCl$_2$•2H$_2$O | 2.20 | 2.20 | 2.20 |
| SP 1045P | 5.00 | 5.00 | 5.00 |
| HD 6706.19 | — | 39.0 | — |
| Hardness (ShoreA) | 53 | 47 | 42 |
| UTS (psi) | 607 | 528 | 467 |
| UE (%) | 262 | 267 | 196 |
| M100 (psi) | 332 | 277 | 270 |
| CS (%, 22 hr, 100° C.) | 26 | 16 | 18 |
| TS (%) | 9 | 8 | 6 |

EXAMPLE 5

Example 5 is similar to Example 4 except that solution SB rubber was used in place of PB rubber as the elastomeric constituent of the TPV. The replacement of iHPP with PE yielded a 25% improvement in compression set (from 32% to 24%). The replacement of iHPP with isotactic poly(1-butene) yielded a nearly 41% improvement in compression set (from 32% to 19%).

TABLE 5

| | Formulation | | |
|---|---|---|---|
| | 8c | 8.1 | 8.2 |
| SBR VSL 5025-0 HM | 100 | 100 | 100 |
| Sunpar 150M | 75.0 | 75.0 | 75.0 |
| PP51S07A | 39.0 | — | — |
| PB 0110 | 10.0 | 10.0 | 49.0 |
| ZnO | 2.00 | 2.00 | 2.00 |
| $SnCl_2 \cdot 2H_2O$ | 2.20 | 2.20 | 2.20 |
| SP 1045P | 5.00 | 5.00 | 5.00 |
| HD 6706.19 | — | 39.0 | — |
| Hardness (ShoreA) | 62 | 53 | 50 |
| UTS (psi) | 545 | 439 | 378 |
| UE (%) | 201 | 189 | 139 |
| M100 (psi) | 393 | 344 | 320 |
| CS (%, 22 hr, 100° C.) | 32 | 24 | 19 |
| TS (%) | 10 | 11 | Broke |

EXAMPLE 6

Example 6 is similar to Example 5 except that emulsion SB rubber was used in place of solution SB rubber as the elastomeric constituent of the TPV. The replacement of iHPP with PE yielded a 38% improvement in compression set (from 21% to 13%). The replacement of iHPP with isotactic poly(1-butene) yielded a 14% improvement in compression set (from 21% to 18%).

TABLE 6

| | Formulation | | |
|---|---|---|---|
| | 9c | 9.1 | 9.2 |
| SBR 1502NN | 100 | 100 | 100 |
| Sunpar 150M | 50 | 50 | 50 |
| PP51S07A | 39.0 | — | — |
| PB 0110 | 10.0 | 10.0 | 49.0 |
| ZnO | 2.00 | 2.00 | 2.00 |
| $SnCl_2 \cdot 2H_2O$ | 2.20 | 2.20 | 2.20 |
| SP 1045P | 5.00 | 5.00 | 5.00 |
| HD 6706.19 | — | 39.0 | — |
| Hardness (ShoreA) | 74 | 70 | 65 |
| UTS (psi) | 1056 | 983 | 495 |
| UE (%) | 191 | 240 | 99 |
| M100 (psi) | 718 | 589 | — |
| CS (%, 22 hr, 100° C.) | 21 | 13 | 18 |
| TS (%) | 9 | 10 | Broke |

EXAMPLE 7

In Example 7, improved compression set (%, 22 hr, 70° C.) resulting from the replacement of iHPP (Tm~165° C.) with high density PE (Tm~130° C.) in a TPV comprising PB rubber having a high weight percent of cis isomer as the rubber is shown. Control 9c was prepared by blending 100 parts of PB rubber having 96% cis content, 60 parts of iHPP, an amount of oil and suitable amounts of resin curing agents. In Sample 9 the iHPP is replaced by high density polyethylene. All formulations were fully cured using a resin cure. The replacement of iHPP with PE yielded a 41% improvement in compression set (from 29% to 17%).

TABLE 7

| | Formulation | |
|---|---|---|
| | 9c | 9 |
| Budene 1280 | 100 | 100 |
| AES 150PR | 75.0 | 75.0 |
| PP51S07A | 60.00 | — |
| DC 2-5084 | — | — |
| PC 085 (0.5 mg/g) | — | — |
| $SnCl_2 \cdot 2H_2O$ | 1.80 | 1.80 |
| SP 1045P | 8.00 | 8.00 |
| HD 6706.19 | — | 60.0 |
| Hardness (ShoreA) | 72 | 71 |
| UTS (psi) | 960 | 836 |
| UE (%) | 175 | 190 |
| M100 (psi) | 704 | 628 |
| CS (%, 22 hr, 100° C.) | 29 | 17 |
| TS (%) | 7 | 12 |

EXAMPLE 8

Example 8 demonstrates the very low compression set (%, 22 hr, 100° C.) that can be achieved in a resin cured, solution SB rubber TPV comprising an approximately 80/20 blend of PE and isotactic poly(1-butene) as the plastic phase. Compression set was 9%.

TABLE 8

| | Formulation | |
|---|---|---|
| | 5mb | 10 |
| VSL 5025 | 100 | |
| N330 Black | 10.0 | |
| Sunpar 150M | 75.0 | |
| Icecepk Clay | 15.0 | |
| 5mb | | 200 |
| HD 6706.19 | | 39.0 |
| PB 0110 | | 10.0 |
| $SnCl_2 \cdot 2H_2O$ | | 2.20 |
| SP 1045P | | 5.00 |
| Hardness (ShoreA) | | 60 |
| UTS (psi) | | 770 |
| UE (%) | | 179 |
| M100 (psi) | | 488 |
| CS (%, 22 hr, 100° C.) | | 9 |
| TS (%) | | 9 |

The Examples demonstrate that across a wide array of TPVs, high temperature compression set can be improved by selecting between otherwise suitable polyolefins for the plastic phase. More specifically, the data show that compression set can be significantly affected by selecting low melting point temperature polyolefins over high melting temperature polyolefins in TPVs having a variety of different elastomer constituents.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:
1. A method of preparing a thermoplastic vulcanizate that includes an elastomer and a polyolefin blend, the method comprising:
selecting a first amount of an elastomer, wherein the elastomer is selected from the group consisting of conjugated diene rubber, unsaturated styrenic triblock copolymer rubber, hydrogenated styrenic triblock copolymer rubber, ethylene propylene rubber, and blends thereof, and wherein the first amount of the elastomer is from 20% by weight to 80% by weight based on the total weight of the elastomer and polyolefin blend;
selecting a second amount of a polyolefin blend, wherein the polyolefin blend comprises from 30% by weight to 100% by weight of the polyolefin blend of at least a first 1-olefin polymer having a melting point of between 115° C. and 140° C. and from 70% by weight to 0% by weight of the polyolefin blend of at least a second 1-olefin polymer having a melting point greater than 150° C., wherein the second amount of the polyolefin blend is from 20% by weight to 80% by weight based on the total weight of the elastomer and polyolefin blend; and wherein the weight percent of the at least a first 1-olefin polymer in the polyolefin blend is selected to achieve at least a 10% improvement in the compression set of the thermoplastic vulcanizate as compared to a benchmark thermoplastic vulcanizate comprised of the first amount of the elastomer and the second amount of the at least a second 1-olefin polymer;
blending the first amount of the elastomer and the second amount of the polyolefin blend; and
dynamically vulcanizing the elastomer in the presence of at least one of the first 1-olefin and the second 1-olefin; and where said step of dynamically vulcanizing fully cures the elastomer
wherein:
the conjugated diene rubber comprises styrene butadiene rubber, polybutadiene rubber, polyisoprene rubber, and blends thereof;
the unsaturated styrenic triblock copolymer rubber comprises SBS and SIS rubber and blends thereof;
the hydrogenated styrenic triblock copolymer rubber comprises one or more of SEEPS, SEPS, SEBS and blends thereof;
the ethylene propylene rubber comprises EPDM rubber, EP rubber, and blends thereof;
the at least a first 1-olefin polymer is selected from the group consisting of polyethylene, isotactic poly(1-butene), syndiotactic polypropylene: and wherein the at least a second 1-olefin polymer is isotactic polypropylene
the polyolefin blend comprises from 40% by weight to 90% by weight of the at least a first 1-olefin polymer and from 60% by weight to 10% by weight of the at least a second 1-olefin polymer, wherein the elastomer comprises styrene butadiene rubber;
the weight percent of the at least a first 1-olefin polymer in the polyolefin blend is selected to achieve from between 25% and 55% improvement in the compression set of the thermoplastic vulcanizate as compared to the benchmark thermoplastic vulcanizate;
the elastomer further comprises from 5% by weight to 50% by weight of the total elastomer of EPDM rubber.

2. A method of preparing a thermoplastic vulcanizate that includes an elastomer and a polyolefin blend, the method comprising:
selecting a first amount of an elastomer, wherein the elastomer is selected from the group consisting of conjugated diene rubber, unsaturated styrenic triblock copolymer rubber, hydrogenated styrenic triblock copolymer rubber, ethylene propylene rubber, and blends thereof, and wherein the first amount of the elastomer is from 20% by weight to 80% by weight based on the total weight of the elastomer and polyolefin blend;
selecting a second amount of a polyolefin blend, wherein the polyolefin blend comprises from 30% by weight to 100% by weight of the polyolefin blend of at least a first 1-olefin polymer having a melting point of between 115° C. and 140° C. and from 70% by weight to 0% by weight of the polyolefin blend of at least a second 1-olefin polymer having a melting point greater than 150° C. wherein the second amount of the polyolefin blend is from 20% by weight to 80% by weight based on the total weight of the elastomer and polyolefin blend; and wherein the weight percent of the at least a first 1-olefin polymer in the polyolefin blend is selected to achieve at least a 10% improvement in the compression set of the thermoplastic vulcanizate as compared to a benchmark thermoplastic vulcanizate comprised of the first amount of the elastomer and the second amount of the at least a second 1-olefin polymer;
blending the first amount of the elastomer and the second amount of the polyolefin blend; and
dynamically vulcanizing the elastomer in the presence of at least one of the first 1-olefin and the second 1-olefin; and where said step of dynamically vulcanizing fully cures the elastomer;
wherein:
the conjugated diene rubber comprises styrene butadiene rubber, polybutadiene rubber, polyisoprene rubber, and blends thereof;
the unsaturated styrenic triblock copolymer rubber comprises SBS and SIS rubber and blends thereof;
the hydrogenated styrenic triblock copolymer rubber comprises one or more of SEEPS, SEPS, SEBS and blends thereof;
the ethylene propylene rubber comprises EPDM rubber, EP rubber, and blends thereof;
the at least a first 1-olefin polymer is selected from the group consisting of polyethylene, isotactic poly(1-butene), syndiotactic polypropylene; and wherein the at least a second 1-olefin polymer is isotactic polypropylene
the polyolefin blend comprises from 40% by weight to 90% by weight of the at least a first 1-olefin polymer and from 60% by weight to 10% by weight of the at least a second 1-olefin polymer, wherein the elastomer comprises styrene butadiene rubber;
the weight percent of the at least a first 1-olefin polymer in the polyolefin blend is selected to achieve from between 25% and 55% improvement in the compression set of the thermoplastic vulcanizate as compared to the benchmark thermoplastic vulcanizate;
the elastomer further comprises from 5% by weight to 50% by weight of the total elastomer of SEBS rubber.

3. A thermoplastic vulcanizate comprising:
(a) a dynamically vulcanized elastomer comprising:
a conjugated diene rubber,
an unsaturated styrenic triblock copolymer rubber,
an ethylene propylene rubber, and
blends thereof;
(b) a polyolefin, wherein the polyolefin comprises at least 60% by weight of isotactic polypropylene; and wherein
the thermoplastic vulcanizate has a compression set of less than 15%,
the elastomer is fully cured.

4. A thermoplastic vulcanizate comprising:
(a) polyolefin blend comprising:
from 30% by weight to 60% of at least a first 1-olefin polymer having a melting point of between 115° C. and 140° C. and selected from the group consisting of polyethylene, isotactic poly(1-butene, syndiotactic polypropylene, and
from 70% by weight to 40% by weight of the polyolefin blend of at least a second 1-olefin polymer having a melting point greater than 150° C., based on the weight of the polyolefin blend, and (b) from 20% by weight to 80% by weight of a dynamically vulcanized elastomer, based on the total weight of the polyolefin blend and dynamically vulcanized elastomer, said elastomer comprising:
from 50% by weight to 95% by weight of styrene butadiene rubber
from 5% by weight to 50% by weight of EPDM rubber, and
a processing agent, based on the total weight of the elastomer,
wherein:
the amount of processing agent is based on a vinyl weight fraction of the copolymerized butadiene in the styrene butadiene rubber and a copolymerized butadiene weight fraction of the styrene butadiene rubber;
the rubber is fully cured.

* * * * *